(12) United States Patent
Kamikawa

(10) Patent No.: US 8,933,160 B2
(45) Date of Patent: Jan. 13, 2015

(54) RESIN COMPOSITION AND PRODUCT MOLDED FROM THE SAME

(75) Inventor: Hiroo Kamikawa, Uji (JP)

(73) Assignee: Unitika Ltd., Hyogo (JP)

( * ) Notice: Subject to any disclaimer, the term of this patent is extended or adjusted under 35 U.S.C. 154(b) by 1023 days.

(21) Appl. No.: 12/084,616

(22) PCT Filed: Nov. 27, 2006

(86) PCT No.: PCT/JP2006/323556
§ 371 (c)(1),
(2), (4) Date: May 5, 2008

(87) PCT Pub. No.: WO2007/063795
PCT Pub. Date: Jun. 7, 2007

(65) Prior Publication Data
US 2009/0099296 A1    Apr. 16, 2009

(30) Foreign Application Priority Data

Nov. 29, 2005   (JP) .................................. 2005-343902

(51) Int. Cl.
*B60C 1/00*   (2006.01)
*C08G 73/10*   (2006.01)
*C08L 67/03*   (2006.01)
*C08L 69/00*   (2006.01)
C08K 3/36   (2006.01)
C08K 7/18   (2006.01)

(52) U.S. Cl.
CPC ................. *C08L 67/03* (2013.01); *C08L 69/00* (2013.01); *C08K 3/36* (2013.01); *C08K 7/18* (2013.01)
USPC ............................ 524/493; 524/492; 524/847

(58) Field of Classification Search
USPC .................................. 524/492, 493, 847, 912
See application file for complete search history.

(56) References Cited

U.S. PATENT DOCUMENTS

| 4,879,355 A | * | 11/1989 | Light et al. ..................... 525/439 |
| 6,476,098 B1 | * | 11/2002 | Arakawa et al. ............. 523/206 |
| 2003/0158309 A1 | * | 8/2003 | Ono et al. ..................... 524/261 |

FOREIGN PATENT DOCUMENTS

| JP | 10292101 A | * 11/1998 | .............. C08L 69/00 |
| JP | 2000-264619 | 9/2000 | |
| JP | 2001-066800 | 3/2001 | |
| JP | 2001-288351 | 10/2001 | |
| JP | 2002-146233 | 5/2002 | |
| JP | 2003-113296 | 4/2003 | |
| JP | 2003-253097 | 9/2003 | |
| JP | 2006-117814 | 5/2006 | |
| JP | 2006-299254 | 11/2006 | |

OTHER PUBLICATIONS

Machine translation of JP 2002-146233 (2002).*
Machine translation of JP 2003-113296 (2003).*
Machine Translation of JP 10-292101 A.*
Machine translation of JP 2001-066800.
Supplementary European Search Report in EP 06833360.8 dated Apr. 24, 2014.

* cited by examiner

*Primary Examiner* — Ling Choi
*Assistant Examiner* — Thuy-Ai Nguyen
(74) *Attorney, Agent, or Firm* — Fildes & Outland, P.C.

(57)    ABSTRACT

A resin composition is provided, which comprises: 40 to 95% by mass of a resin component containing 10 to 100% by mass of a polyarylate resin and 90 to 0% by mass of a polycarbonate resin; and 60 to 5% by mass of spherical silica having an average particle diameter of not greater than 10 μm. The resin composition is molded into a product.

2 Claims, No Drawings

RESIN COMPOSITION AND PRODUCT MOLDED FROM THE SAME

TECHNICAL FIELD

The present invention relates to a resin composition excellent in heat creep resistance, retention stability, dimensional stability and impact resistance, and to a product molded from the resin composition.

BACKGROUND ART

Conventionally, components molded from glass-reinforced polycarbonate resins are often used as precision components for digital appliances. Specific examples of such components include lens components for digital cameras and disk centering components for optical disk drives which require dimensional stability.

With recent rapid progress in technology, however, the conventional glass-reinforced polycarbonate resins are often insufficient to meet performance requirements. For example, glass dust released from a gate-cut portion of a molded component results in malfunction of a product. In the case of a lens component of a digital camera which includes CCD elements arranged at a higher density for an increased number of camera pixels, for example, dust of glass fibers contained in the glass-reinforced polycarbonate resin covers some lens elements to cause image pick-up failures. In the case of a disk drive which is required to have a higher level of reading accuracy for a higher density disk, a disk centering component should have higher dimensional stability. Further, the component is liable to be deformed due to heat creep because heat generation by a motor is increased due to higher speed rotation of the disk. The glass-reinforced polycarbonate resin is unsatisfactory in heat resistance. Therefore, consideration should be given to a heat dissipation design and a creep-free shape design, thereby limiting the design flexibility. In some cases, soldering is required for mounting an electronic circuit component in the vicinity of a molded component after assembly of the molded component. If the component is molded from the polycarbonate resin, the component will be deformed due to soldering heat, thereby suffering from limitations in design flexibility.

To solve these problems, the inventor of the present invention developed resin compositions excellent in heat resistance and dimensional stability by blending a polyarylate resin, a polycarbonate resin and an inorganic filler such as glass flakes or glass beads (JP-A-2001-288351 and JP-A-2003-113296).

DISCLOSURE OF THE INVENTION

Problems to be Solved by the Invention

Where the glass flakes are employed, however, the glass flakes are smaller in aspect ratio than the glass fibers, but are planar in shape and hence highly anisotropic. Therefore, a component molded from a resin composition containing the glass flakes is liable to be deformed due to strain orientation occurring during molding thereof and hence has a limited dimensional stability. Where an inorganic mineral filler such as talc and kaolin is employed instead of the glass flakes, the resulting molded component also suffers from the same problem because of its planar shape. In addition, the inorganic mineral filler such as talc and kaolin contains a higher percentage of alkaline impurities, so that the polycarbonate resin and the polyarylate resin are poorer in retention stability under heating during processing thereof.

Where the glass beads are blended, the glass beads are spherical and hence free from the problems associated with the anisotropy. If the glass beads have a lower alkaline content, the resulting resin composition is excellent in retention stability. However, a non-fibrous filler such as glass beads is unsatisfactory in impact resistance. Where a resin composition containing such a non-fibrous filler is employed as a material for a component of a mobile phone or the like, there is a possibility that the component of the phone is cracked when the phone is inadvertently dropped to the ground.

To solve the aforementioned problems, it is an object of the present invention to provide a resin composition excellent in dimensional stability, heat resistance, retention stability and impact resistance, and to provide a product molded from the resin composition. Particularly, the present invention is aimed at eliminating the problems associated with the release of the filler from the molded product during use.

Means for Solving the Problems

As a result of intensive studies conducted to solve the aforementioned problems, the inventor of the present invention has found that the object of the present invention is achieved by blending a predetermined amount of spherical silica in a resin component including a polyarylate resin and a polycarbonate resin, and attained the present invention.

The present invention has the following features.
(1) A resin composition comprising: 40 to 95% by mass of a resin component containing 10 to 100% by mass of a polyarylate resin and 90 to 0% by mass of a polycarbonate resin; and 60 to 5% by mass of spherical silica having an average particle diameter of not greater than 10 μm.
(2) A product molded from the resin composition (1).

Effects of the Invention

According to the present invention, the resin composition comprises: 40 to 95% by mass of the resin component containing 10 to 100% by mass of the polyarylate resin and 90 to 0% by mass of the polycarbonate resin; and 60 to 5% by mass of the spherical silica having an average particle diameter of not greater than 10 μm. Therefore, the resin composition is excellent in dimensional stability, heat resistance, retention stability and impact resistance. In addition, the spherical silica is less liable to be released from the product molded from the resin composition during use. Therefore, the molded product is applicable to any of various precision components, such as lens components for digital cameras, lens components for mobile phones with cameras and recording disk centering components, which are required to have higher performance. Therefore, the present invention has very high industrial applicability.

BEST MODE FOR CARRYING OUT THE INVENTION

The inventive resin composition contains a resin component including a polyarylate resin and a polycarbonate resin, and spherical silica.

The polyarylate resin should be present in a proportion of 30 to 90% by mass and is preferred to be a proportion of 30 to 90% by mass based on 100% by mass of the resin component including the polyarylate resin and the polycarbonate resin. If the proportion of the polyarylate resin is less than 10% by mass, a heat resistance improving effect is poorer.

In the present invention, the polyarylate resin is defined as a resin containing an aromatic dicarboxylic acid residue and a bisphenol residue.

Exemplary polyarylate materials for introduction of the bisphenol residue include bisphenols. Specific examples of the bisphenols include 2,2-bis(4-hydroxyphenyl)propane (hereinafter referred to as "bisphenol-A"), 2,2-bis(4-hydroxy-3,5-dimethylphenyl)propane, 2,2-bis(4-hydroxy-3,5-dibromophenyl)propane, 2,2-bis(4-hydroxy-3,5-dichlorophenyl)propane, 4,4'-dihydroxydiphenyl sulfone, 4,4'-dihydroxydiphenyl ether, 4,4'-dihydroxydiphenyl sulfide, 4,4'-dihydroxydiphenyl ketone, 4,4'-dihydroxydiphenylmethane and 1,1-bis(4-hydroxyphenyl)cyclohexane. These compounds may be used either alone or in combination. Particularly, bisphenol-A is preferred from an economic viewpoint.

Preferred examples of a material for introduction of the aromatic dicarboxylic acid residue include terephthalic acid and isophthalic acid. In the present invention, a polyarylate resin obtained by employing terephthalic acid and isophthalic acid in combination is particularly preferred in terms of melt processability and mechanical characteristic. The mixing ratio (of terephthalic acid/isophthalic acid) may be properly selected, but is preferably 90/10 to 10/90, more preferably 70/30 to 30/70, most preferably 50/50, in molar ratio. If the mixing molar ratio of terephthalic acid is less than 10% by mole or greater than 90% by mole, it is difficult to provide a sufficient polymerization degree in polymerization employing an interfacial polymerization method.

In the present invention, the polycarbonate resin is defined as a resin containing a bisphenol residue and a carbonate residue.

Exemplary bisphenols to be employed as a material for introduction of the bisphenol residue include bisphenol-A, 2,2-bis(3,5-dibromo-4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)decane, 1,4-bis(4-hydroxyphenyl)propane, 1,1-bis(4-hydroxyphenyl)cyclododecane, 4,4'-dihydroxydiphenyl ether, 4,4'-dithiodiphenol, 4,4'-dihydroxy-3,3'-dichlorodiphenyl ether and 4,4'-dihydroxy-2,5-dihydroxydiphenyl ether. Other examples of the bisphenols include diphenols described in U.S. Pat. No. 2,999,835, U.S. Pat. No. 3,028,365, U.S. Pat. No. 3,334,154 and U.S. Pat. No. 4,131,575. These bisphenols may be used either alone or in combination.

Exemplary precursors for introduction of the carbonate residue include carbonyl halides such as phosgene, and carbonates such as diphenyl carbonate.

In the present invention, the resin component including the polyarylate resin and the polycarbonate resin may be prepared by melt-kneading the polyarylate resin and the polycarbonate resin, or a copolymer of the polyarylate resin and the polycarbonate resin may be used as the resin component.

Methods of polymerizing the polyarylate resin, the polycarbonate resin and the polyarylate/polycarbonate copolymer resin are not particularly limited as long as the object of the present invention can be attained. Known polymerization methods such as an interfacial polymerization method and a melt polymerization method may be employed.

In the present invention, the resin component including the polyarylate resin and the polycarbonate resin preferably has a limiting viscosity of 0.50 to 0.65. If the limiting viscosity is greater than 0.65, the melt viscosity is increased, so that injection molding is difficult. If the limiting viscosity is less than 0.50, the resulting molded product tends to have insufficient impact resistance.

The inventive resin composition is prepared by blending the spherical silica in the resin component including the polyarylate resin and the polycarbonate resin.

The proportion of the spherical silica to be blended should be 5 to 60% by mass based on the entire resin composition and is preferred to be 20 to 40% by mass based on the entire resin composition. If the proportion is less than 5% by mass, the resulting resin composition is unsatisfactory in dimensional stability. If the proportion is less than 5%, a component produced from the resulting resin composition will have insufficient dimensional stability. If the proportion is greater than 60% by mass, it is difficult to pelletize the resulting resin composition by melt-kneading and extrusion, and like inconveniences will occur in the production of the resin composition.

In the present invention, the average particle diameter of the spherical silica to be blended in the resin composition is defined as a particle diameter at which a cumulative weight percentage of 50% is observed in a particle diameter distribution measured by means of a particle size distribution measuring device such as a laser diffraction/scattering particle size distribution measuring device. The measurement is performed on a dispersion prepared by dispersing the spherical silica in water or an alcohol at a measurable concentration by means of an ultrasonic dispersing machine.

Where the spherical silica blended in the inventive resin composition has a smaller average particle diameter, dust of the spherical silica released from a product produced from the resin composition is less liable to impair the function of the product. In practice, the average particle diameter should be not greater than 10 μm, and is preferably not greater than 5 μm. If the average particle diameter is greater than 10 μm, dust of the silica released, for example, from a camera lens component produced from the resulting resin composition will hinder image pick-up. If the average particle diameter of the spherical silica is greater than 10 μm, a component produced from the resulting resin composition will have insufficient dimensional stability.

In the present invention, a production method for the spherical silica is not particularly limited as long as the dimensional stability, the retention stability and the impact resistance can be provided as intended by the present invention. Any of known production methods may be employed. An exemplary production method is such that fine silica particles are put into a high-temperature flame to be melted and fluidized and, when the resulting melt is formed into spherical particles due to surface tension, the spherical particles are suddenly cooled. Other exemplary methods for production of very fine silica particles include a method in which a chemical flame is formed in an oxygen-containing atmosphere by an ignition burner and silicon powder is put into the chemical flame in such an amount as to permit formation of a particle cloud and subjected to particle explosion, and a sol-gel method in which an alkoxysilane is hydrolyzed and aggregated.

The spherical silica may be surface-treated with a silane coupling agent for improvement of adhesion of the spherical silica to the resin matrix.

A dispersant may be used for dispersing the spherical silica in the resin matrix. Examples of the dispersant include fatty acid esters and derivatives of the fatty acid esters, and fatty acid amides and derivatives of the fatty acid amides. Examples of the fatty acid amides include ethylene bishydroxystearamide and ethylene bisstearamide. By evenly dispersing the silica in the resin matrix, the resin composition is imparted with a smaller molding contraction percentage and a smaller linear expansion coefficient and hence improved in dimensional stability. The amount of the dispersant to be added is desirably 0.01 to 0.5 parts by mass based on 100 parts by mass of the inventive resin composition.

Other additives such as a pigment, a dye, a weather resistant agent, an antioxidant, a heat stabilizer, a flame retardant, a mold releasing agent, an antistatic agent, an impact resistance improving agent, a very high molecular weight polyethylene and a lubricant such as a fluororesin may be added to the inventive resin composition, as long as the properties of the resin composition are not impaired.

In the present invention, the method of blending the spherical silica and other additives with the resin component including the polyarylate resin and the polycarbonate resin is not particularly limited, but any method which permits uniform dispersion of the additives in the resin component may be employed. More specifically, the polyarylate resin, the polycarbonate resin, the spherical silica and other additives are uniformly blended by means of a tumbler or a Henschel mixer, and then the resulting blend is melt-kneaded and pelletized.

The inventive resin composition can be easily molded into a product by injection molding or extrusion.

EXAMPLES

The present invention will hereinafter be described in detail by way of inventive examples and comparative examples.

1. Materials

Polyarylate resin available under the trade name of U-POWDER from Unitika Ltd. (having a limiting viscosity of 0.55)

Polycarbonate resin available under the trade name of CARIBER K200-13 from Sumitomo Dow Ltd. (having a limiting viscosity of 0.49)

Spherical silica-A available under the trade name of FB-5SDC from Denkikagaku Kogyo Co., Ltd. (having an average particle diameter of 5 μm)

Spherical silica-B available under the trade name of SFP-30M from Denkikagaku Kogyo Co., Ltd. (having an average particle diameter of 0.7 μm)

Spherical silica-C available under the trade name of FB-945 from Denkikagaku Kogyo Co., Ltd. (having an average particle diameter of 15 μm)

Glass Beads available under the trade name of EMB-10 from Potters-Ballotini Co., Ltd. (having an average particle diameter of 5 μm)

Talc available under the trade name of MICROACE K-1 from Nippon Talc Co., Ltd. (having an average particle diameter of 7 μm)

Dispersant: Ethylene bishydroxystearamide available from Cognis Company

2. Evaluation Methods (1) Limiting Viscosity

The limiting viscosity was determined based on the viscosity of a solution measured at 25° C. by employing 1,1,2,2-tetrachloroethane as a solvent for dissolving a sample. If a product molded in a molding cycle of 60 seconds has a limiting viscosity of less than 0.45, the product is poorer in impact resistance and in retention stability during processing. In the present invention, a resin composition having a limiting viscosity of not less than 0.45 was rated as excellent.

(2) Melt-Kneadability

A sample was evaluated for melt-kneadability based on the following criteria.

Excellent (◯): A resin composition which was successfully extruded into a strand from a nozzle of an extruder.

Unacceptable (x): A resin composition which suffered from fragmentation of a strand immediately after extrusion thereof from the nozzle.

(3) Flexural Strength

The flexural strength was measured in conformity with ASTM D790.

(4) Izod Impact Strength

The Izod impact strength was measured in conformity with ASTM D256. If a product has a lower Izod impact strength, the product is liable to be cracked when it is dropped. Therefore, a sample having an Izod impact strength of not less than 70 J/m was rated as excellent.

(5) DTUL (Distortion Temperature Under Load)

The DTUL was measured with a load of 1.8 MPa in conformity with ASTM D648. In terms of heat creep resistance and soldering resistance, a sample having a DTUL of not less than 150° C. has a significantly improved design flexibility.

(6) Molding Shrinkage Percentage

A test sample was prepared in conformity with ASTM D790, and the length of the test sample was measured. The molding shrinkage percentage was calculated from the following expression:

$$\frac{\text{Mold size} - \text{Length of Molded sample}}{\text{Mold size}} \times 100$$

In terms of dimensional stability, a sample having a molding shrinkage percentage of not greater than 0.7 was rated as excellent.

(7) Dimensional Stability

A ring shaped sample having an outer diameter of 30 mm, an inner diameter of 26 mm and a thickness of 2 mm was injection-molded from a single side gate, and the inner diameter of the sample was measured at multiple points by a high-precision two-dimensional measuring device (Model UM-8400 available from Keyence Corporation). Then, a maximum inner diameter, a minimum inner diameter and an average inner diameter of the sample were determined, and a value calculated from the following expression was employed as an index of dimensional stability:

$$\frac{\text{Maximum inner diameter} - \text{Minimum inner diameter}}{\text{Average inner diameter}} \times 100$$

The dimensional stability is increased as the value is reduced. If the value is not greater than 0.2, the sample was regarded as having excellent dimensional stability.

(8) Hiding Degree

The hiding degree is herein defined as the number of lens elements covered with a single particle of an inorganic filler (the spherical silica, the glass bead or the talc) released from a lens holder onto a camera lens including a $\frac{1}{2.5}$ inch CCD (having an effective pixel number of 5,000,000 and dimensions of 5.7 mm×4.3 mm). The hiding degree was approximately determined from the following expression:

$$\frac{(\text{Average particle size of released particles})^2 \times 5}{5.7 \times 4.3}$$

The hiding degree of each of the inorganic fillers was calculated. If the hiding degree is not less than 10, the release of the particles adversely affects the hiding property.

Examples 1 to 7 and Comparative Examples 1 to 6

Resin compositions were each prepared by blending ingredients in proportions as shown in Table 1, melt-kneading the resulting blend at a barrel temperature of 320° C., extruding the resulting melt into a strand from a nozzle of the unidirectional twin screw extruder (Model TEM-37BS available from Toshiba Machine Co., Ltd.) and immersing the resulting strand in a water bath to cool and solidify the strand. Then, the strand of the resin composition was cut by means of a pelletizer, followed by drying with hot air at 120° C. for 12 hours. Thus, pellets of each of the resin compositions were provided.

In turn, test pieces were prepared by molding the resulting resin composition pellets at a resin temperature of 340° C. in a molding cycle of 30 seconds by means of an injection molding machine (Model IS100E-3S available from Toshiba Machine Co., Ltd.) A molding cycle of 60 seconds was also employed for preparation of test pieces for the measurement of the solution viscosity. These test pieces were allowed to stand at a room temperature for one or more days, and then evaluated for the flexural strength, the Izod impact strength, the DTUL, the molding contraction percentage and the limiting viscosity. The results of the evaluation are shown in Table 1.

A resin composition of Comparative Example 5 was not successfully extruded into a strand from the nozzle with fragmentation of the strand, so that the pelletization was impossible. Therefore, no evaluation was performed on the test pieces.

sitions of Examples 1 to 7 were excellent in dimensional stability and hiding degree. In Example 4 in which the dispersant was added, the dimensional stability was more excellent with a smaller molding contraction percentage than in Example 3 in which no dispersant was added.

In Comparative Example 1 in which the proportion of the polyarylate resin was less than the range specified by the present invention, the DTUL was lower. In Comparative Example 2 in which the glass beads were employed instead of the spherical silica A or B, the Izod impact strength was lower. In Comparative Example 3 in which the talc was employed instead of the spherical silica A or B, the retention stability was poorer and the Izod impact strength was lower. In Comparative Example 4 in which the proportion of the spherical silica A was less than the range specified by the present invention, the dimensional stability was poorer with a higher molding contraction percentage. In Comparative Example 5 in which the proportion of the spherical silica A was greater than the range specified by the present invention, the melt-kneadability during the extrusion was poorer as described above. In Comparative Example 6 in which the spherical silica C having an average particle diameter greater than the range specified by the present invention was employed, the dimensional stability was poorer and the hiding degree was disadvantageously reduced due to the release of the spherical silica C.

What is claimed is:
1. A resin composition consisting of:

TABLE 1

| | Example | | | | | | | Comparative Example | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Composition (parts by mass) | | | | | | | | | | | | | |
| Polyarylate resin | 80 | 40 | 24 | 24 | 27 | 15 | 24 | 4 | 24 | 24 | 29.1 | 9 | 24 |
| Polycarbonate resin | | 40 | 56 | 56 | 63 | 35 | 56 | 76 | 56 | 56 | 67.9 | 21 | 56 |
| Spherical silica A (Average particle diameter: 5 μm) | 20 | 20 | 20 | 20 | 10 | 50 | | 20 | | | 3 | 70 | |
| Spherical silica B (Average particle diameter: 0.7 μm) | | | | | | | 20 | | | | | | |
| Spherical silica C (Average particle diameter: 15 μm) | | | | | | | | | | | | | 20 |
| Glass beads | | | | | | | | | 20 | | | | |
| Talc | | | | | | | | | | 20 | | | |
| Ethylene bishydrostearamide | | | | 0.1 | | | | | | | | | |
| Characteristic properties | | | | | | | | | | | | | |
| Melt-kneadability | ○ | ○ | ○ | ○ | ○ | ○ | ○ | ○ | ○ | ○ | ○ | x | ○ |
| Flexural strength (MPa) | 101 | 100 | 102 | 101 | 95 | 124 | 102 | 104 | 102 | 114 | 90 | — | 102 |
| Izod impact strength (J/m) | 97 | 108 | 124 | 127 | 185 | 75 | 130 | 134 | 57 | 46 | 357 | — | 130 |
| DTUL (1.8 MPa) (° C.) | 178 | 156 | 152 | 150 | 150 | 155 | 152 | 145 | 153 | 153 | 150 | — | 152 |
| Molding contraction percentage (%) | 0.6 | 0.6 | 0.6 | 0.5 | 0.7 | 0.2 | 0.5 | 0.6 | 0.6 | 0.5 | 1.0 | — | 0.5 |
| Limiting viscosity  Molding cycle: 30 seconds | 0.51 | 0.48 | 0.47 | 0.47 | 0.47 | 0.47 | 0.47 | 0.46 | 0.49 | 0.45 | 0.48 | — | 0.47 |
| Molding cycle: 60 seconds | 0.50 | 0.47 | 0.46 | 0.46 | 0.46 | 0.45 | 0.46 | 0.45 | 0.46 | 0.42 | 0.47 | — | 0.46 |
| Dimensional stability | 0.16 | 0.16 | 0.15 | 0.14 | 0.18 | 0.11 | 0.14 | 0.14 | 0.15 | 0.21 | 0.18 | — | 0.25 |
| Hiding degree | 5.1 | 5.1 | 5.1 | 5.1 | 5.1 | 5.1 | 0.1 | 5.1 | 5.1 | 10 | 5.1 | 5.1 | 45.9 |

The resin compositions of Examples 1 to 7 were excellent in flexural strength, Izod impact strength, DTUL and molding shrinkage percentage, and excellent in retention stability with little reduction in the solution viscosity of the sample molded in a molding cycle of 60 seconds. Further, the resin compo- 40 to 95% by mass of a resin component consisting of 30 to 90% by mass of a polyarylate resin and 70 to 10% by mass of a polycarbonate resin; and 60 to 5% by mass of spherical silica having an average particle diameter of not greater than 5 μm, wherein the resin component consisting of the polyarylate resin and the polycarbonate resin has a limiting viscosity of 0.50 to 0.65.

2. A product molded from a resin composition as recited in claim 1.

* * * * *